United States Patent
Bennett, Sr. et al.

(10) Patent No.: US 10,240,681 B1
(45) Date of Patent: Mar. 26, 2019

(54) OIL PUMP PRESSURE RELIEF VALVE LAYOUT

(71) Applicant: GM Global Technology Operations LLC, Detroit, MI (US)

(72) Inventors: Andy Bennett, Sr., Rochester Hills, MI (US); Joel H. Pike, Haslett, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/698,620

(22) Filed: Sep. 7, 2017

(51) Int. Cl.
| F16K 17/04 | (2006.01) |
| F16K 17/28 | (2006.01) |
| F01M 1/16 | (2006.01) |
| F16K 17/30 | (2006.01) |
| F16K 17/06 | (2006.01) |

(52) U.S. Cl.
CPC ........... *F16K 17/0406* (2013.01); *F01M 1/16* (2013.01); *F16K 17/06* (2013.01); *F16K 17/285* (2013.01); *F16K 17/30* (2013.01); *Y10T 137/7927* (2015.04); *Y10T 137/87845* (2015.04)

(58) Field of Classification Search
CPC ..... Y10T 137/87845; Y10T 137/87861; Y10T 137/786; Y10T 137/7859; Y10T 137/7927; Y10T 137/7937; F16K 17/30; F16K 17/285; F16K 17/0406; F16K 17/06; F01M 1/16
See application file for complete search history.

(56) References Cited

U.S. PATENT DOCUMENTS

| 3,465,787 | A | 9/1969 | Gulick | |
| 7,174,799 | B2* | 2/2007 | Yoshida | F16H 7/0836 474/101 |
| 7,766,034 | B2* | 8/2010 | Talaski | F16K 15/044 137/533.11 |
| 9,086,119 | B2* | 7/2015 | Kurematsu | F16H 7/08 |
| 2005/0265856 | A1* | 12/2005 | Yoshida | F16H 7/0836 417/362 |
| 2008/0029165 | A1* | 2/2008 | Beck | F16K 15/046 137/539 |
| 2008/0289703 | A1* | 11/2008 | Penzone, Jr. | F16H 7/0848 137/539 |
| 2010/0001103 | A1* | 1/2010 | Neto | F01M 1/08 239/583 |
| 2014/0007955 | A1* | 1/2014 | Dziurda | F16K 15/044 137/539 |
| 2015/0292492 | A1* | 10/2015 | Kim | F04B 1/0452 417/505 |

\* cited by examiner

*Primary Examiner* — Matthew W Jellett
(74) *Attorney, Agent, or Firm* — Harness, Dickey & Pierce, P.L.C.

(57) ABSTRACT

A pressure relief valve includes a valve housing having an inlet end with an inlet opening having a valve seat surface surrounding the inlet opening. The valve housing defines an outlet end with a plurality of outlet holes and a valve chamber disposed between the valve seat and the outlet end. One of the plurality of outlet holes has a smaller cross section than the other outlet holes. The valve chamber includes a plurality of radially protruding grooves extending radially beyond a base diameter. One of the plurality of radially protruding grooves has a groove cross section that is smaller than a groove cross section of the remaining grooves, which along with the smaller outlet hole cause a lateral pressure imbalance on the valve member so that the valve member tends to remain in contact with a side of the valve seat while permitting relief flow.

20 Claims, 5 Drawing Sheets

OIL PUMP PRESSURE RELIEF VALVE LAYOUT

FIELD

The present disclosure relates to a pressure relief valve and more particularly to an oil pump pressure relief valve.

BACKGROUND

This section provides background information related to the present disclosure which is not necessarily prior art.

Pressure relief valves are commonly used in internal combustion engines, vehicle transmissions and other industrial machines that utilize a fluid such as lubricating oil or hydraulic fluid in lubricating systems and/or hydraulically controlled systems. The pressure relief valves are designed to limit a pressure of the fluid to a predetermined value and open to provide a relief flow to reduce the fluid pressure when the pressure exceeds the predetermined value.

With reference to FIGS. 6-8, a conventional pressure relief valve 100 is shown including a valve housing 102 having a valve chamber 104 with an inlet end 106 having an inlet opening 108 and a valve seat surface 110 surrounding the inlet opening 108. The valve chamber 104 further includes an outlet end 112 with three equally sized and spaced outlet holes 114, as best shown in FIG. 8. A ball valve member 116 is disposed in the valve chamber 104 and is biased toward the valve seat surface 110 by a coil spring 118 that is disposed against the outlet end 112. The valve chamber 104 includes three equally sized and spaced radially protruding grooves 120, as best shown in the cross-sectional view of FIG. 7, and extending axially from the valve seat surface 110 to the outlet end 112.

When the operating pressure is consistently in the range of the predetermined pressure value, the pressure relief valve can oscillate between open and closed positions. The oscillating pressure relief valve 100 can create a chattering noise and can create wear on the valve member 116 and valve seat 110 that may increase oil leakage through the pressure relief valve 100. Accordingly, it is desirable to provide a pressure relief valve that can reduce valve oscillations, reduce noise/chatter and increase valve life and robustness.

SUMMARY

This section provides a general summary of the disclosure, and is not a comprehensive disclosure of its full scope or all of its features.

According to the principles of the present disclosure, a pressure relief valve includes a valve housing having an inlet end with an inlet opening having a valve seat surface surrounding the inlet opening. The valve housing defines an outlet end with a plurality of outlet holes and a valve chamber disposed between the valve seat and the outlet end. One of the plurality of outlet holes has a smaller cross section than remaining ones of the plurality of outlet holes in order to cause a lateral pressure imbalance on a valve member so that the valve member tends to remain in contact with a side of the valve seat while permitting relief flow. The valve chamber has a base diameter and includes a plurality of radially protruding grooves extending radially beyond the base diameter and extending axially from the valve seat surface to the outlet end. One of the plurality of radially protruding grooves has a groove cross section that is smaller than a groove cross section of remaining ones of the plurality of radially protruding grooves in order to further cause a lateral pressure imbalance on the valve member so that the valve member tends to remain in contact with a side of the valve seat while permitting relief flow. Because the valve member tends to remain in contact with a side of the valve seat, valve chatter is reduced or eliminated and the valve life and robustness are improved.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
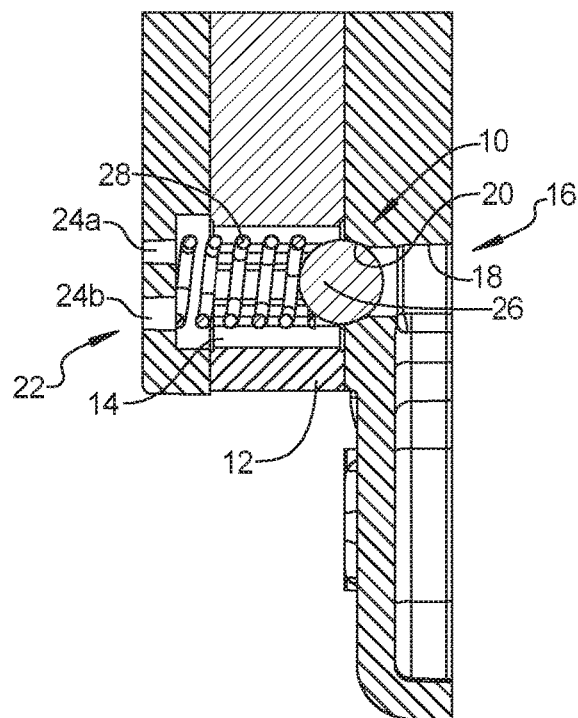
FIG. 1 is a cross-sectional view of an oil pump pressure relief valve according to the principles of the present disclosure shown in a closed position.
Figure 2:
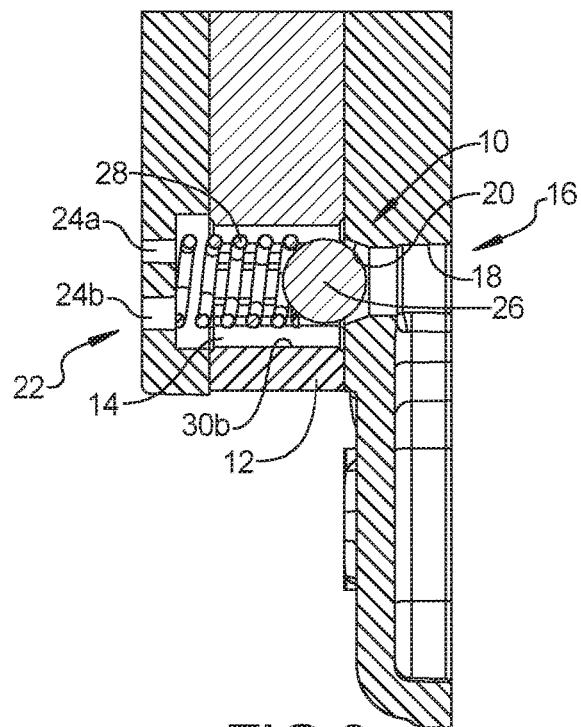
FIG. 2 is a cross-sectional view of the pressure relief valve shown in an open position.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 3:
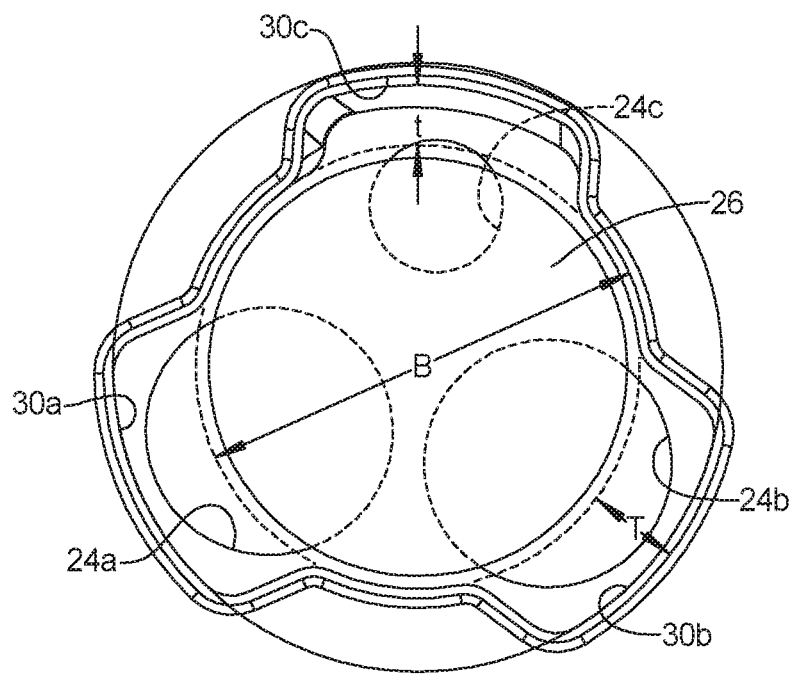
FIG. 3 is a cross-sectional view of the pressure relief valve taken along line 3-3 of FIG. 1.
Figure 4:
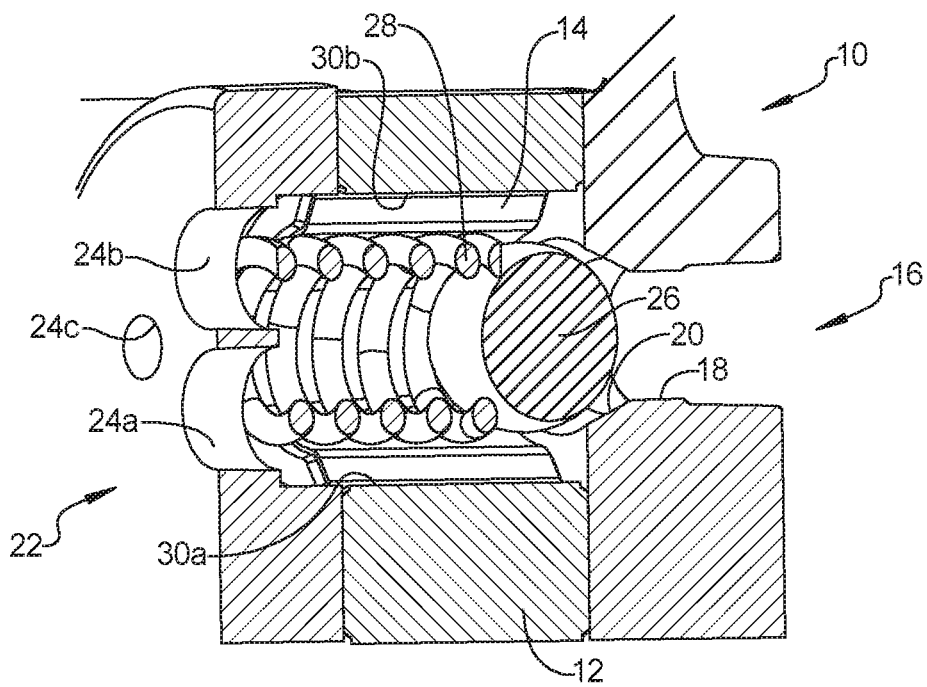
FIG. 4 is a perspective view of a cross-section of the pressure relief valve according to the principles of the present disclosure.
Figure 5:
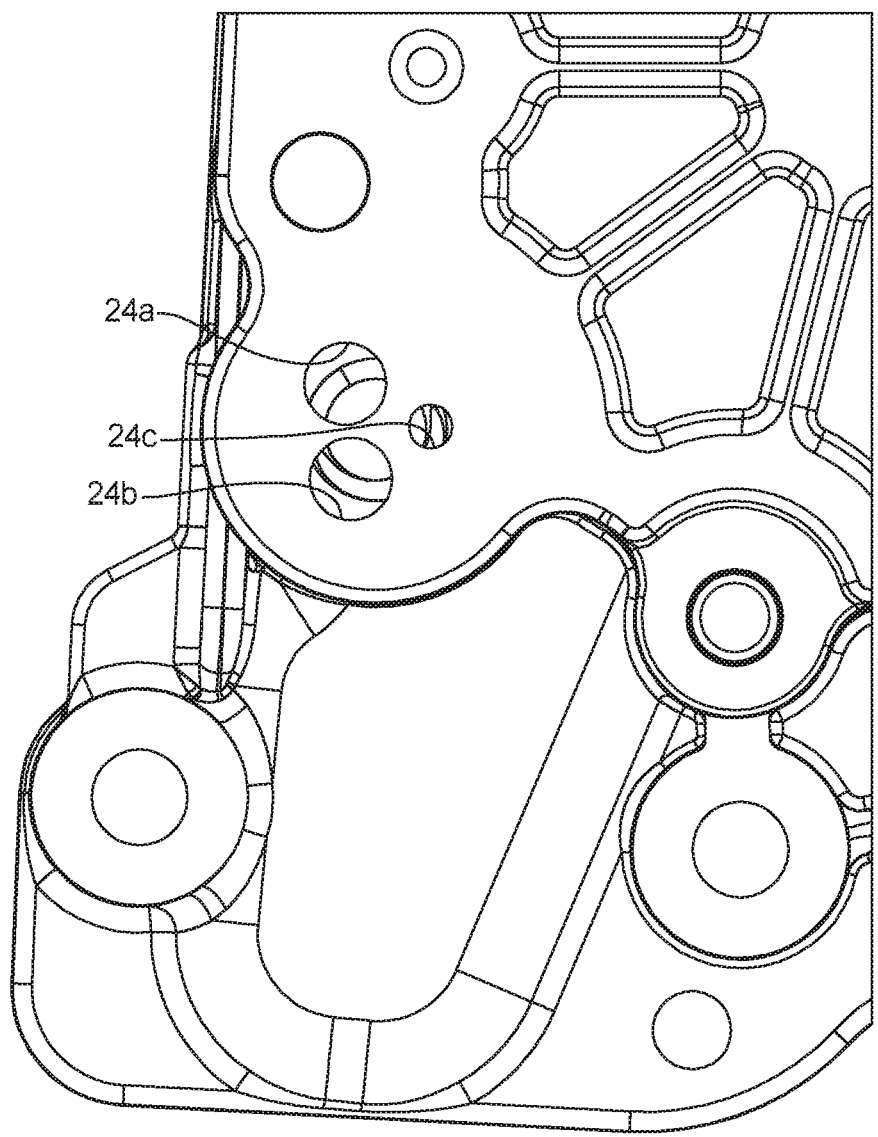
FIG. 5 is a plan view of the outlet end of the pressure relief valve according to the principles of the present disclosure.

With reference to FIGS. 1-5, a pressure relief valve 10 according to the principles of the present disclosure is shown including a valve housing 12 having a valve chamber 14 with an inlet end 16 having an inlet opening 18 and a cone-shaped valve seat surface 20 surrounding the inlet opening 18. The valve chamber 14 further includes an outlet end 22 with a plurality of spaced outlet holes 24a-c, as best shown in FIG. 5. As shown in FIG. 5, the outlet holes 24a, 24b are of generally equal size and a have be circular in shape with a first diameter to define a first cross sectional area. The outlet hole 24c is shown as being circular in shape with a second diameter smaller than the first diameter of the outlet holes 24a, 24b and to define a second cross sectional area smaller than the first cross sectional area of the outlet holes 24a, 24b. It should be understood that the shapes of the outlet holes 24a-24c can be varied.

A ball valve member 26 is disposed in the valve chamber 14 and is biased toward the valve seat surface 20 by a coil spring 28 that is disposed against the outlet end 22.

The valve chamber 14 includes a base diameter region defined by a base diameter B and three spaced radially protruding grooves 30a-c extending from the base diameter region, as best shown in the cross-sectional view of FIG. 3. The radially protruding grooves 30a-c extend axially from the valve seat surface 20 to the outlet end 22. The radially protruding grooves 30a, 30b each have a first cross sectional area and the radially protruding groove 30c has a second cross sectional area that is smaller than the first cross sectional area of the radially protruding grooves 30a, 30b. As shown in FIG. 3, the radially protruding groove 30c extends radially outward from the base diameter by a smaller distance t than a distance T that the radially protruding grooves 30a, 30b extend radially outward from the base diameter B. It should be understood that the cross sectional area of the radially protruding groove 30c can be made smaller by reducing a width of the radially protruding groove 30c.

The smaller diameter outlet hole 24c and the smaller cross-section radially protruding groove 30c achieve a redistribution of internal pressures on the valve member 26 during the relief-flow phase. The smaller hole diameter of the outlet hole 24C and the smaller cross-section radially protruding groove 30c creates greater back pressure on one side of the valve member 26 which tends to cause the valve member 26 to remain in contact with the opposing side of the conical valve seat surface 20, as illustrated in FIG. 4. Because the valve member 26 tends to remain in contact with one side of the conical valve seat surface 20, valve chatter can be reduced as the valve member 26 moves to allow oil to pass around the valve member.

Figure 6:
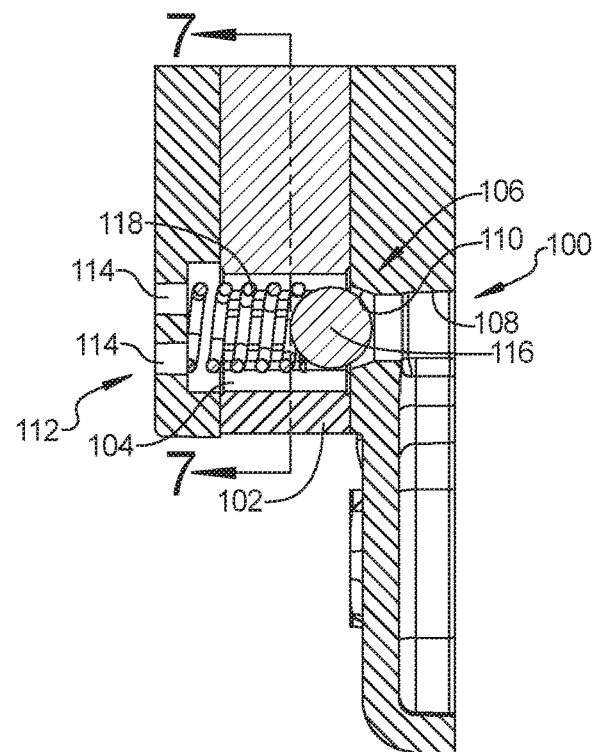
FIG. 6 is a cross-sectional view of a conventional pressure relief valve.
Figure 7:
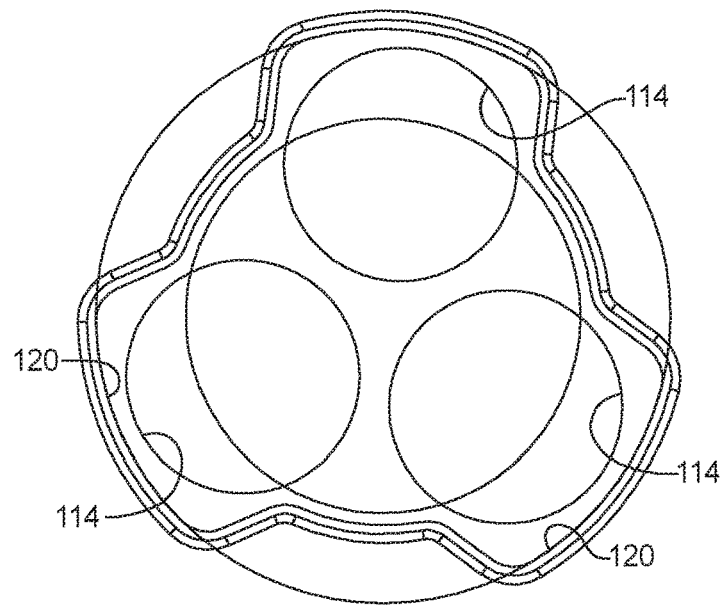
FIG. 7 is a cross-sectional view of the conventional pressure relief valve taken along line 7-7 of FIG. 6.
Figure 8:
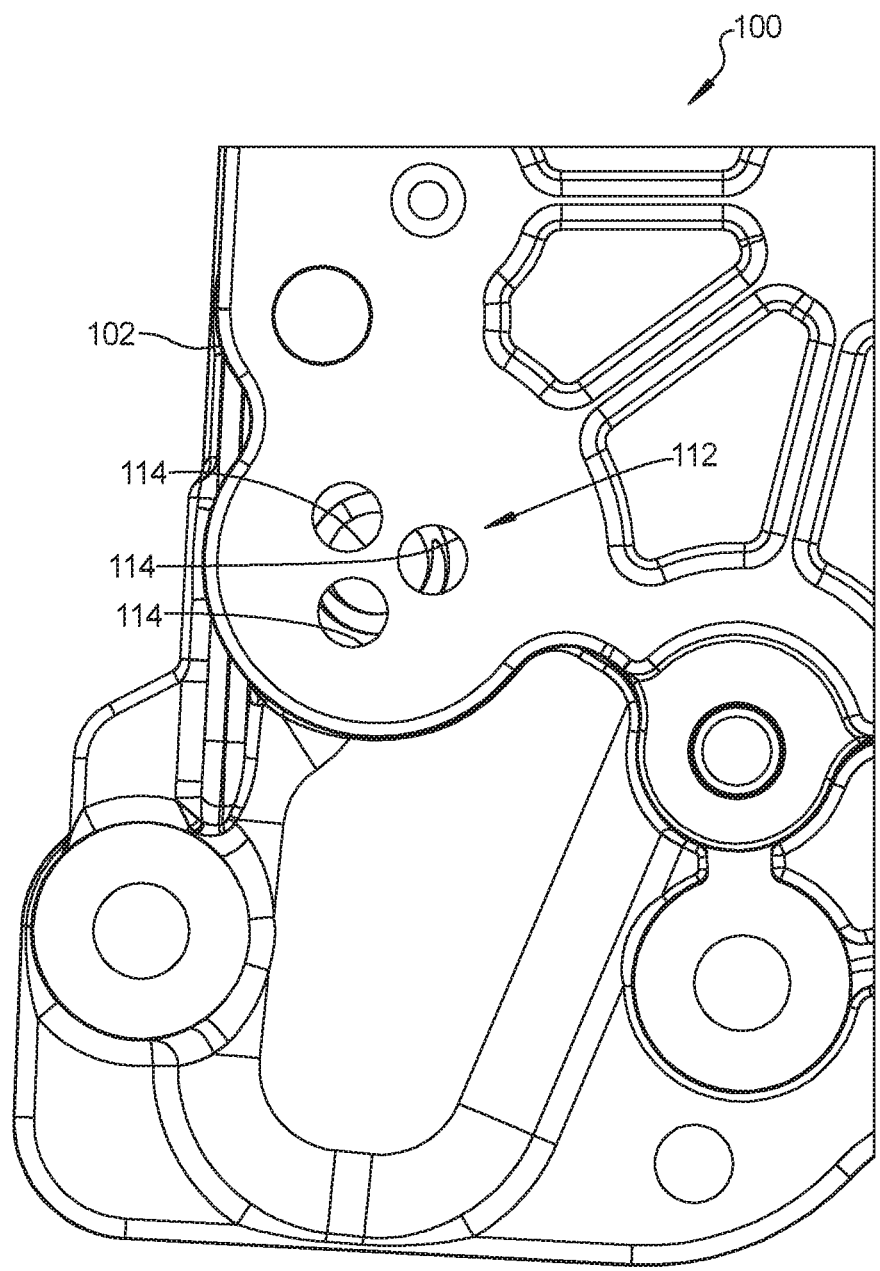
FIG. 8 is a plan view of the outlet end of the conventional pressure relief valve shown in FIG. 6.

In tests performed in which the pressure relief valve of the present disclosure were compared to the conventional pressure relief valve design as disclosed in FIGS. 6-8, at every valve opening position, the magnitude of the radial forces acting on the ball in the pressure relief valve are greater for the present design, providing a more consistent "push" to one side, in order to reduce the ball chatter and thus reduce noise and wear on the valve member 26 and valve seat surface 20. Accordingly, the present disclosure provides an improved pressure relief valve design with reduced valve oscillations, noise and increased valve life and robustness by merely varying the geometry of the internal grooves and outlet openings.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A pressure relief valve, comprising:
 a valve housing having an inlet end with an inlet opening having a valve seat surface surrounding the inlet opening, an outlet end with a plurality of separate outlet holes and a valve chamber disposed between the inlet end and the outlet end, one of said plurality of separate outlet holes having a smaller cross section than remaining ones of said plurality of separate outlet holes;
 a valve member disposed in the valve chamber and biased toward the valve seat surface by a spring member that is disposed against the outlet end;

wherein the valve chamber has a base diameter and includes a plurality of separate radially protruding grooves extending radially beyond the base diameter and extending axially from the valve seat surface to the outlet end, one of said plurality of separate radially protruding grooves having a groove cross section that is smaller than a groove cross section of remaining ones of the plurality of separate radially protruding grooves.

2. The pressure relief valve according to claim 1, wherein the valve member is a ball.

3. The pressure relief valve according to claim 1, wherein the plurality of separate radially protruding grooves are circumferentially spaced along a perimeter of the base diameter of the valve chamber.

4. The pressure relief valve according to claim 1, wherein the spring member is a coil spring having a diameter that is smaller than the base diameter of the valve chamber.

5. The pressure relief valve according to claim 1, wherein the one of said plurality of separate radially protruding grooves having a groove cross section that is smaller than a groove cross section of remaining ones of the plurality of separate radially protruding grooves includes a smaller outer diameter than an outer diameter of the remaining ones of the plurality of separate radially protruding grooves.

6. The pressure relief valve according to claim 1, wherein the one of said plurality of separate radially protruding grooves having a groove cross section that is smaller than a groove cross section of remaining ones of the plurality of separate radially protruding grooves includes a smaller width than a width of the remaining ones of the plurality of separate radially protruding grooves.

7. The pressure relief valve according to claim 1, wherein the plurality of separate outlet holes include three outlet holes.

8. The pressure relief valve according to claim 1, wherein the plurality of separate radially protruding grooves include three radially protruding grooves.

9. The pressure relief valve according to claim 1, wherein the plurality of separate outlet holes are circular in cross section.

10. The pressure relief valve according to claim 1, wherein the valve seat surface is conical.

11. The pressure relief valve according to claim 1, wherein the plurality of separate outlet holes are in alignment with corresponding ones of the plurality of separate radially protruding grooves.

12. The pressure relief valve according to claim 11, wherein the one of the plurality of separate outlet holes having a smaller cross section than remaining ones of the plurality of separate outlet holes is aligned with the one of the plurality of separate radially protruding grooves having a groove cross section that is smaller than a groove cross section of remaining ones of the plurality of separate radially protruding grooves.

13. A pressure relief valve, comprising:
a valve housing having an inlet end with an inlet opening having a conical valve seat surface surrounding the inlet opening, an outlet end with three separate outlet holes and a valve chamber disposed between the conical valve seat and the outlet end, one of said three separate outlet holes having a smaller cross section than remaining ones of said three separate outlet holes;
a ball valve member disposed in the valve chamber and biased toward the valve seat surface by a coil spring that is disposed against the outlet end;
wherein the valve chamber has a base diameter and includes three separate radially protruding grooves extending radially beyond the base diameter and extending axially from the valve seat surface to the outlet end, one of the three separate radially protruding grooves having a groove cross section that is smaller than a groove cross section of remaining ones of the three separate radially protruding grooves.

14. The pressure relief valve according to claim 13, wherein the three separate radially protruding grooves are circumferentially spaced along a perimeter of the base diameter of the valve chamber.

15. The pressure relief valve according to claim 13, wherein the coil spring has a diameter that is smaller than the base diameter of the valve chamber.

16. The pressure relief valve according to claim 13, wherein the one of the three separate radially protruding grooves having a groove cross section that is smaller than a groove cross section of remaining ones of the three separate radially protruding grooves includes a smaller outer diameter than an outer diameter of the remaining ones of the three separate radially protruding grooves.

17. The pressure relief valve according to claim 13, wherein the one of said three separate radially protruding grooves having a groove cross section that is smaller than a groove cross section of remaining ones of the three separate radially protruding grooves includes a smaller width than a width of the remaining ones of the three separate radially protruding grooves.

18. The pressure relief valve according to claim 13, wherein the three separate outlet holes are circular in cross section.

19. The pressure relief valve according to claim 13, wherein the three separate outlet holes are in alignment with corresponding ones of the three separate radially protruding grooves.

20. The pressure relief valve according to claim 19, wherein the one of the three separate outlet holes having a smaller cross section than remaining ones of the three separate outlet holes is aligned with the one of the three separate radially protruding grooves having a groove cross section that is smaller than a groove cross section of remaining ones of the three separate radially protruding grooves.

* * * * *